United States Patent [19]
Barnett et al.

[11] 3,952,476
[45] Apr. 27, 1976

[54] BEADING CLIP

[75] Inventors: Barry Roger Michael Barnett, West Drayton; Edward Harry Frederick Ferguson, Harefield, both of England

[73] Assignee: TRW Inc., Cleveland, Ohio

[22] Filed: Apr. 25, 1974

[21] Appl. No.: 463,945

[30] Foreign Application Priority Data
May 25, 1973  United Kingdom............... 25093/73

[52] U.S. Cl.................................... 52/760; 52/718
[51] Int. Cl.² ............................................ F16B 1/00
[58] Field of Search ............ 52/718, 760, 469, 714, 52/47, 52; 24/73 B, 73 PM, 85 B; 296/135

[56] References Cited
UNITED STATES PATENTS

| | | | |
|---|---|---|---|
| 3,373,539 | 3/1968 | Meyer................................. | 52/718 |
| 3,445,979 | 5/1969 | Meyer................................. | 52/718 |
| 3,473,284 | 10/1969 | Meyer................................. | 52/718 |
| 3,631,569 | 1/1972 | Sockerson et al. :.............. | 52/718 X |
| 3,740,800 | 6/1973 | Meyer.............................. | 52/718 X |

*Primary Examiner*—H. Hampton Hunter
*Attorney, Agent, or Firm*—James R. O'Connor

[57] ABSTRACT

A beading clip for attachment to a headed stud projecting from a supporting surface which will, when attached to the stud, clamp a beading against the supporting surface. The clip comprises an arched body portion with a slot extending into one side to permit passage of the shank of the headed stud. A leg extends parallel to the slot and is spaced from the body portion. Abutment means are carried on opposite sides of the body portion. In use the legs engage the supporting surface so that the leg and the body portion are compressed between the supporting surface and the head of the stud. The abutment means clamp the edges of the beading to the supporting surface.

3 Claims, 6 Drawing Figures

BEADING CLIP

BACKGROUND TO THE INVENTION

The present invention relates to a beading clip which is adapted for attachment on a headed stud projecting from a supporting surface and which, when attached on the stud will clamp a beading against the supporting surface.

In the vehicle industry, it is the practice to cover a part of the outer surface of the roof of a vehicle with a foil which may for instance be an aluminium foil. It is necessary to hide the break which occurs at the end of the sheet of foil and for this purpose a beading is provided which is attached to the roof of the vehicle and which hides the edge portion of the foil. It is an object of the present invention to provide a clip to which a beading may be attached to hide the edge portion of the foil.

STATEMENT OF THE INVENTION

According to the present invention there is provided a clip having an arched body portion, a slot extending into one side of the body portion and along which the shank of the stud can pass, at least one leg extending in a direction parallel to the slot, the leg or legs being spaced from the arched body portion and arranged to engage the supporting surface so that the leg or legs and the arched body portion of the clip are compressed between the supporting surface and the head of the stud, and abutment means carried at the said one side of the body portion and the opposite side of the body portion respectively, which are adapted to clamp the edges of a beading to the supporting surface.

The clip may thus be attached to a stud which is welded to the roof of the vehicle and which will hold the beading in position on the roof of the vehicle so as to hide the edge of the foil.

The abutment means, in addition to clamping the edges of the beading to the supporting surface, will also hold the edge portion of the sheet in position and prevent it from lifting away from the roof of the vehicle.

DESCRIPTION OF THE PREFERRED EMBODIMENT

Figure 1:
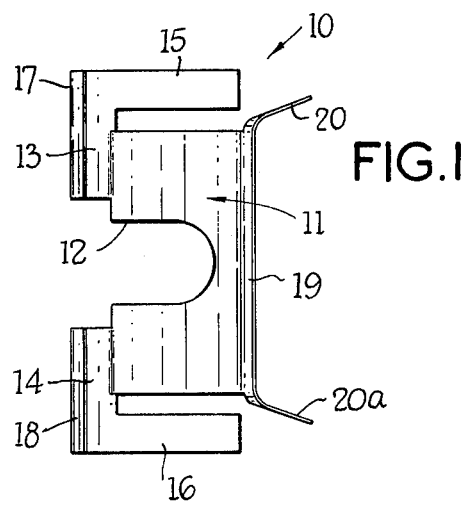
FIG. 1 is a plan view of a clip according to the present invention.
Figure 2:
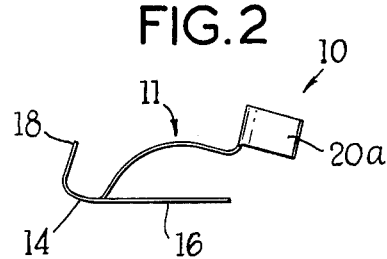
FIG. 2 is a side elevation of the clip of FIG. 1.
Figure 3:
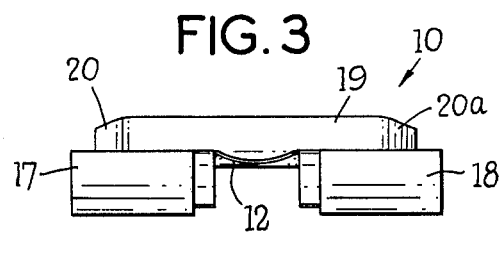
FIG. 3 is a front elevation of the clip of FIG. 1.
Figure 4:
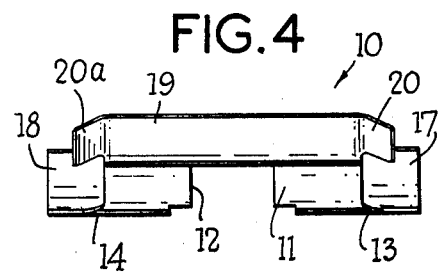
FIG. 4 is a rear elevation of the clip of FIG. 1.

In the drawings a clip is indicated generally at 10 which is formed from sheet metal and which is rendered resilient and rust proof during the manufacturing process.

The resilient clip 10 comprises an arched body portion 11, a slot 12 which extends into one side of the body portion, extensions 13 and 14 of the body portion 11 which lie on either side of the slot 12 and legs 15 and 16 which extend from the extensions 13 and 14 respectively along the opposite ends of the body portion 11.

The legs 15 and 16 lie in the same plane as the extensions 13 and 14 and are substantially flat, but terminate short of the end of the body portion 11 which is remote from the extensions 13 and 14.

The end portions of the extensions 13 and 14 which are remote from the body portion 11 are bent upwardly to form abutments 17 and 18 respectively.

A portion 19 of the body portion 11 at the opposite side to the slot 12 is also bent upwardly and carries lugs 20 and 20a which extend forwardly and downwardly with respect to the body portion 11.

Figure 5:
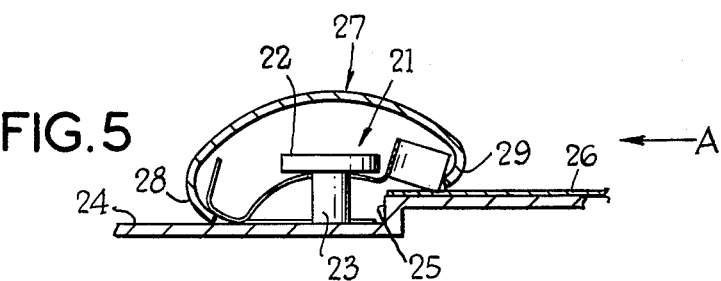
FIG. 5 is an elevation partly in section showing the clip of FIGS. 1 to 4 attached on a headed stud and holding a beading in position on the roof of the vehicle.
Figure 6:
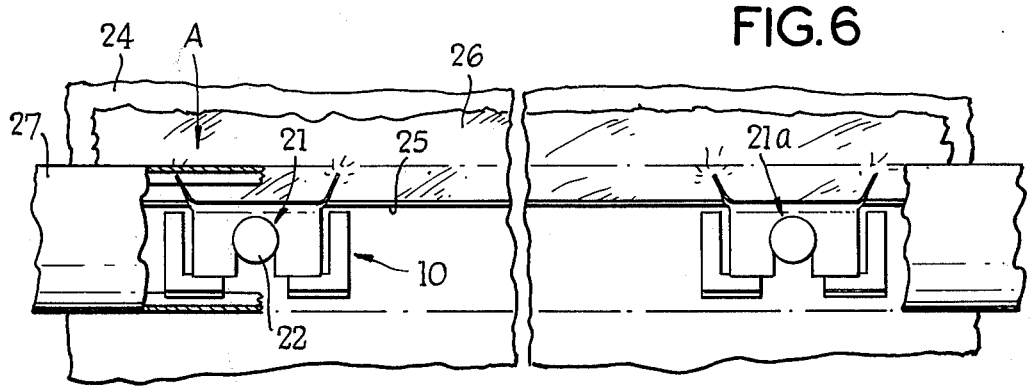
FIG. 6 is a plan view, partly in section, of the assembly shown in FIG. 5.

The clip 10 is shown in FIGS. 5 and 6 mounted on a stud 21 which comprises a head 22 and a shank 23 which is welded to a panel 24. The panel 24 forms a part of the roof of a vehicle and is formed with a step 25. Above the step 25 the roof panel 24 is covered by a sheet 26 of aluminium foil.

A row of the studs 21, 21a are welded to the roof panel 24 adjacent to the step 25, as shown in FIG. 6 and a beading 27 is attached to the studs 21, 21a with the aid of a plurality of clips 10, each one of which is attached to a stud 21, 21a.

In order to attach the clip 10 to the stud 21, the clip 10 is brought up to the stud 21 in the direction of the arrow A, with the slot 12 facing the stud. The clip is then passed over the step 25 and the body portion 11 is depressed and passed under the head 22 of the stud so that the shank 23 of the stud is located in the slot 12. In this position the body portion 11 of the clip is depressed towards the legs 15 and 16 and the clip is placed under permanent tension so that it is firmly and securely mounted on the stud.

The legs 15 and 16 are of a length such that their ends are closely adjacent the step 25 and prevent return of the clip 10 in the reverse direction thereby ensuring that the clip cannot be accidentally dislodged from the stud.

The lugs 20 and 20a bear against the sheet 26 of aluminium foil so as to hold the sheet 26 against the roof panel 24 and prevent any movement of the sheet.

The beading 27 comprises two longitudinally extending inturned flanges 28 and 29 respectively. The beading 27 is attached to the clip 10 by locating the flange 29 against the lugs 20 and 20a of the clip, flattening the beading 27 slightly and snapping the flange 28 over and beneath the abutments 17 and 18 so that the lugs 20 and 20a clamp the flange 29 firmly against the sheet 26 of foil. When the beading 27 is thus mounted on each of the clips 10, which are in turn mounted on the studs 21, 21a, the beading hides the edge of the foil 26, the step 25 in the roof, the studs 21, 21a and the clips 10 so as to provide an attractive finish to the roof. At the same time the beading also serves to hold the edge of the sheet 26 firmly against the roof panel 24 throughout the length of the sheet.

Modifications can be made to the above described embodiment without departing from the spirit and scope of the invention which is best described in the following claims.

What is claimed is:

1. A sheet metal clip for attaching a beading to a support having a headed stud shank attached to and projecting outwardly from a surface of the support with the stud head being spaced from the support, the clip comprising an arcuate body portion having a stud shank receiving slot formed therein and opening out of one side thereof, at least one support surface engaging, substantially planar leg joined to said one side of the arcuate body portion and extending toward the opposite side thereof and being axially spaced from the remainder of said body portion a distance which is not less than the length of the stud shank so that said body portion is depressed toward the plane of the leg and tensioned against the undersurface of the stud head by the leg when the stud shank is seated in the slot in said body portion, and abutment means for clamping the edges of a beading to the support, said abutment means being joined to each side of said body portion, portions of the abutment means on one side of the body portion lying substantially in the plane of said leg and the abutment means on the opposite side of said body portion being located substantially above the plane of said leg.

2. A sheet metal clip according to claim 1 including two support surface engaging legs with one leg extending from each end of the body portion.

3. A sheet metal clip according to claim 1 wherein a pair of lugs extend outwardly from said opposite side of said body portion to provide said abutment means.

* * * * *